(12) United States Patent
Carine et al.

(10) Patent No.: US 6,471,298 B2
(45) Date of Patent: Oct. 29, 2002

(54) CHILD SAFETY SEAT

(75) Inventors: David Shaun Carine, Andover; Andrew Patrick Beaumont, Basingstoke, both of (GB)

(73) Assignee: Britax-Excelsior Limited, Gallows Hill (GB)

( * ) Notice: Subject to any disclaimer, the term of this patent is extended or adjusted under 35 U.S.C. 154(b) by 0 days.

(21) Appl. No.: 09/778,519

(22) Filed: Feb. 7, 2001

(65) Prior Publication Data

US 2001/0013719 A1 Aug. 16, 2001

(30) Foreign Application Priority Data

Feb. 12, 2000 (GB) ................................ 0003170

(51) Int. Cl.[7] .............................................. B60R 22/10
(52) U.S. Cl. ..................... 297/483; 297/482; 297/484
(58) Field of Search .............................. 297/482, 483, 297/484

(56) References Cited

U.S. PATENT DOCUMENTS

| | | | | |
|---|---|---|---|---|
| 4,575,874 A | * | 3/1986 | Johnson | 2/460 |
| 4,678,205 A | * | 7/1987 | Wold | 280/808 |
| 4,838,611 A | * | 6/1989 | Talugon | 297/391 |
| 4,886,318 A | * | 12/1989 | Pennock | 297/482 |
| 4,887,318 A | * | 12/1989 | Weinreb | 2/268 |
| 5,074,588 A | * | 12/1991 | Huspen | 280/801.1 |
| 5,108,152 A | * | 4/1992 | Reilly et al. | 297/482 |
| 5,283,933 A | | 2/1994 | Wiseman et al. | |
| 5,294,183 A | * | 3/1994 | Wetter et al. | 297/472 |
| 5,839,793 A | * | 11/1998 | Merrick et al. | 297/484 |
| 6,048,028 A | * | 4/2000 | Bapst | 297/250.1 |
| 6,322,149 B1 | * | 11/2001 | Conforti et al. | 297/482 |

FOREIGN PATENT DOCUMENTS

| | | |
|---|---|---|
| EP | 0 287 259 A2 | 4/1988 |
| EP | 0 732 235 A2 | 2/1996 |
| JP | 08337138 | * 12/1996 |

* cited by examiner

Primary Examiner—Peter M. Cuomo
Assistant Examiner—Joseph Edell
(74) Attorney, Agent, or Firm—Davis & Bujold, P.L.L.C.

(57) ABSTRACT

A child safety seat for use in a vehicle has a seat body and a harness including a pair of shoulder straps which extend through respective slots in the seat back to a mechanism for adjusting the length of the shoulder straps. The height at which the shoulder straps project from the seat back can be varied by threading them through different slots. A pad is slidably mounted on each shoulder strap and has a cover formed of high friction material on the side thereof facing the child occupant's body. A tether strap has one end attached to each pad and projects through the same slot in the seat back as the corresponding shoulder strap for limiting movement of the corresponding chest pad along the shoulder strap to a predetermined limit distance away from the seat back. Such limit distance increases as the height at which the shoulder straps project from the seat back is increased.

13 Claims, 5 Drawing Sheets

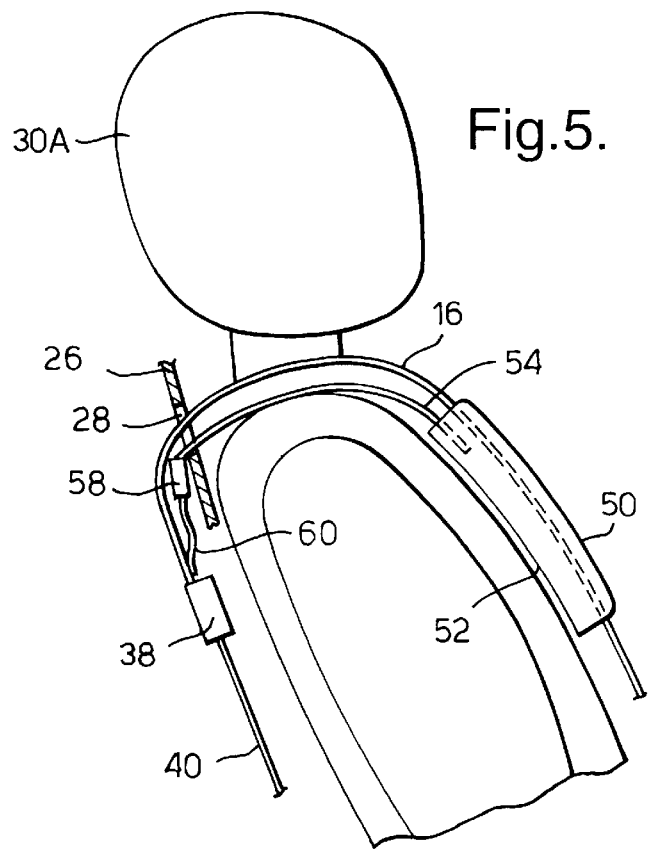
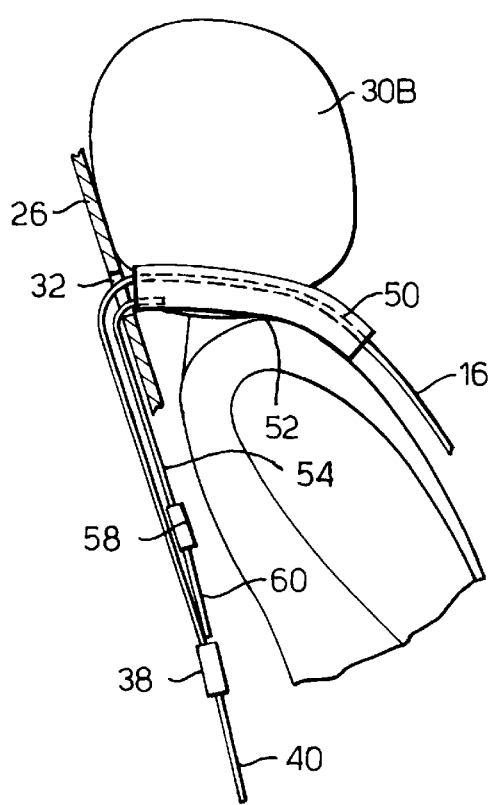

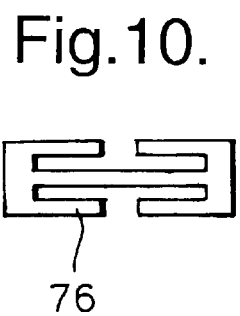
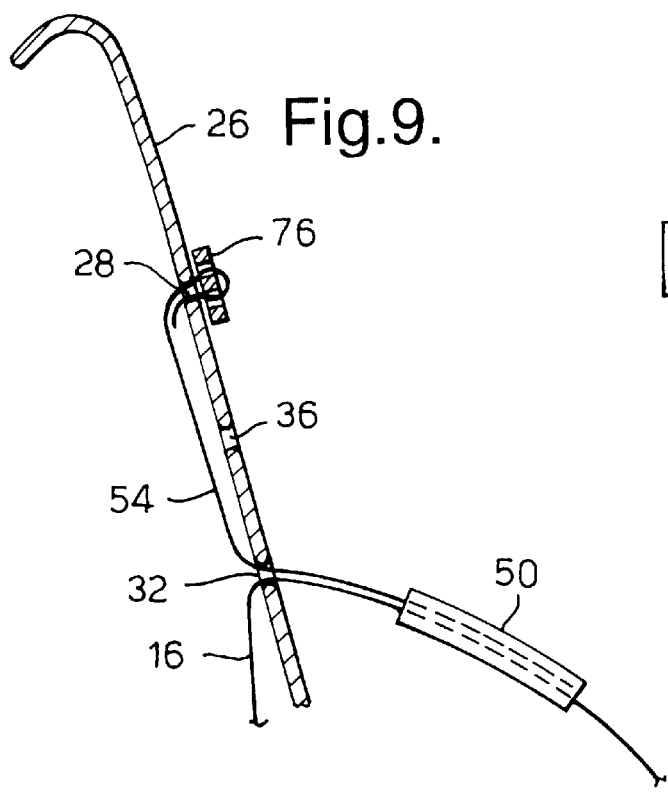
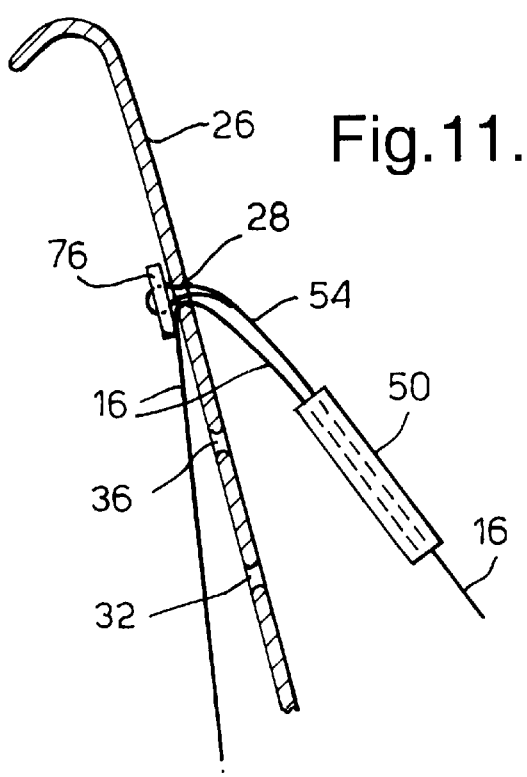

CHILD SAFETY SEAT

FIELD

This invention relates to a child safety seat for use in a vehicle of the type comprising a seat body having a seat back, a harness for a child occupant of the seat, secured to the seat body and including a pair of shoulder straps extending through respective slots in the seat back to a mechanism for adjusting the length of the shoulder straps projecting through said slots, means for varying the height at which the shoulder straps project from the seat back, a respective pad slidably mounted on each shoulder strap and having a cover formed of high friction material on the side thereof facing the child occupant's body, and a respective tether strap having one end attached to each pad and projecting through the same slot in the seat back as the corresponding shoulder strap for limiting movement of the corresponding chest pad along the shoulder strap to a predetermined limit distance away from the seat back. When such a seat is used with the child occupant facing forwards in the vehicle, the shoulder straps tend to stretch during the peak period of deceleration encountered during an accident, allowing angular movement of the child's upper torso about the child's pelvis. This allows forward movement of the child's head and upper torso to such an extent that there is a risk of the child's head making contact with a hard surface of the vehicle. This forward movement is reduced by the chest pads which frictionally engage with the child's clothing and which are secured to the seat back by the tether straps. Since the tether straps are relatively short compared with the shoulder straps, they are subject to a much smaller degree of elongation. The overall effect is to reduce forward movement of the head and upper torso of the child.

When the seat is being used by a relatively small child, the chest pads are both undesirable and unnecessary. They are undesirable because they cause a load to be applied to the child's chest which is excessive for a young child but acceptable for an older child. They are unnecessary because such a child's body is lighter and therefore its inertia does not cause the shoulder straps to stretch to the same extent as for an older child and also because the child's body is smaller so that the same angular movement of the child's upper torso relative to the lower torso results in a smaller extent of forward movement of the child's head.

SUMMARY OF THE INVENTION

It is an object of the invention to provide a child safety seat of the type described above which is suitable for use by a relatively young child and by an older child.

According to the invention, in a child's safety seat of the type described above, each tether strap is attached to adjustment means for increasing said limit distance as the height at which the shoulder straps project from the seat back is increased.

In one form of the invention, each tether strap is secured to a connection location on the corresponding shoulder strap behind the seat back and a blocker is secured to each tether strap between the connection location and the slots in the seat back, the blocker being dimensioned to abut against the seat back surrounding the slots so as to restrict the length of tether strap which can be protracted through the corresponding slot in the seat back while allowing continued protraction of the shoulder strap.

The length of the tether straps which can be protracted through their slot is chosen so that the chest pads are correctly positioned on the chest of an older child. When the harness is adjusted for use by a younger child, the chest pads are drawn towards the slots until they abut against the seat back. In this position, they are positioned on the shoulders of a child rather than on the chest and do not impose such a large load on the child's body.

Preferably, the tether straps are linked to the connection locations on the shoulder straps by elastic so as to allow continued shortening of the shoulder straps after the chest pads have come into abutment with the seat back surrounding the slots.

BRIEF DESCRIPTION OF THE DRAWINGS

FIGS. 5 and 6 are fragmentary side views on an enlarged scale, corresponding to FIGS. 1 and 2 respectively, showing details of the shoulder straps of the harness;

FIG. 9 is a fragmentary side view of a fourth embodiment of the invention adjusted for a small child;

FIG. 10 is a plan view of a component of the fourth embodiment; and

FIG. 11 is a fragmentary side view of a the fourth embodiment adjusted for a larger child.

DETAILED DESCRIPTION OF THE PREFERRED EMBODIMENTS

Figure 1:
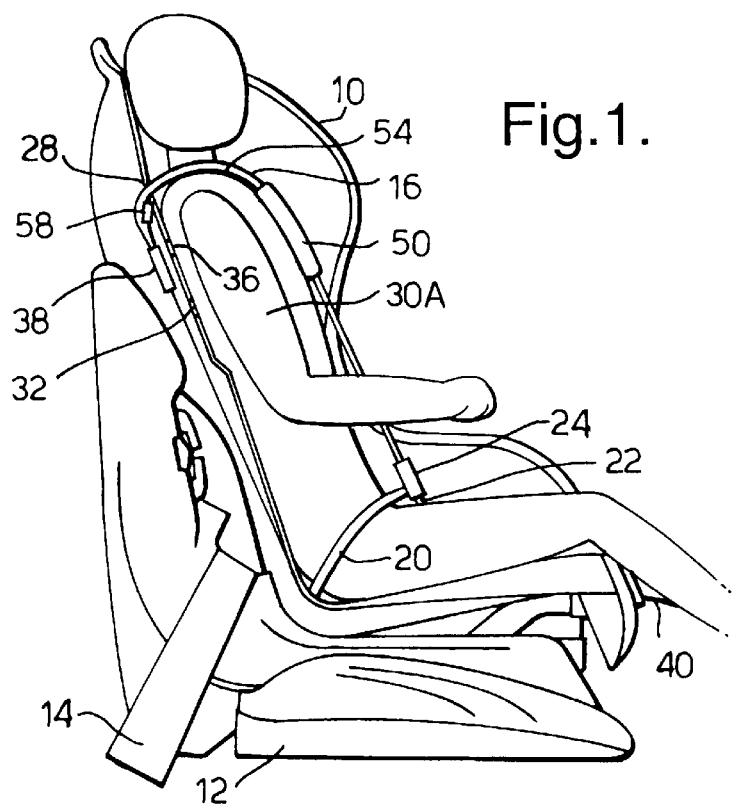
FIG. 1 is a side view of a child's seat in accordance with a first embodiment of the invention, with one side of the seat body partly broken away to show the seat occupied by a child of the heaviest weight for which the seat is designed.

Referring to FIGS. 1 to 4, a child safety seat comprises a seat body 10 mounted on a base 12 and adapted to be secured on a motor car seat by a vehicle seat belt 14. The details of the base 12 may be as described in EP-A-0732235. They form no part of the present invention and will therefore not be described in detail.

The seat body 10 is equipped with a harness comprising a pair of shoulder straps 16 and 18, a pair of lap straps, one of which is visible at 20, and a crotch strap 22, all of which are interconnected by a buckle 24, which may be as described in U.S. Pat. No. 5,283,933.

Figure 2:
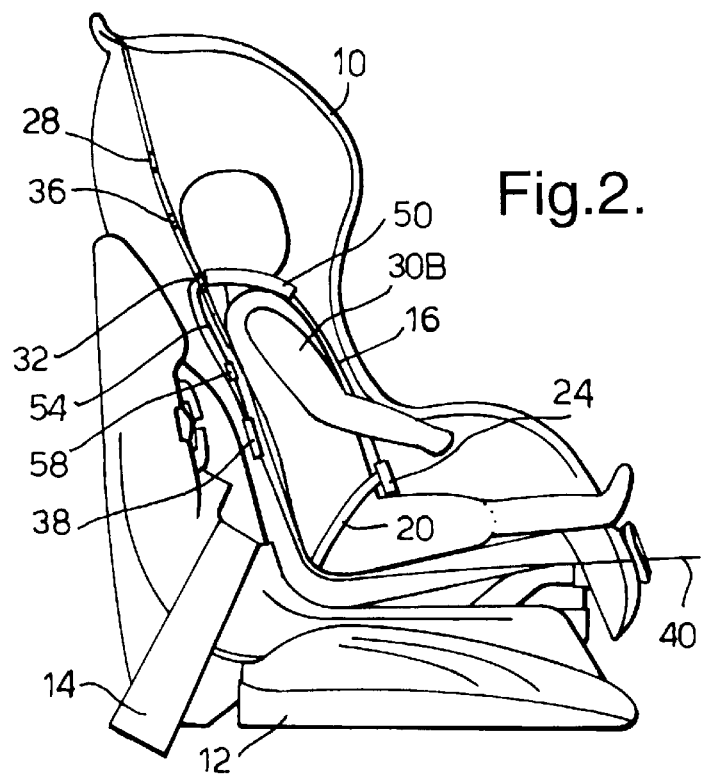
FIG. 2 is a side view, similar to FIG. 1, but showing the seat occupied by a child of the lightest weight for which the seat is designed.
Figure 3:
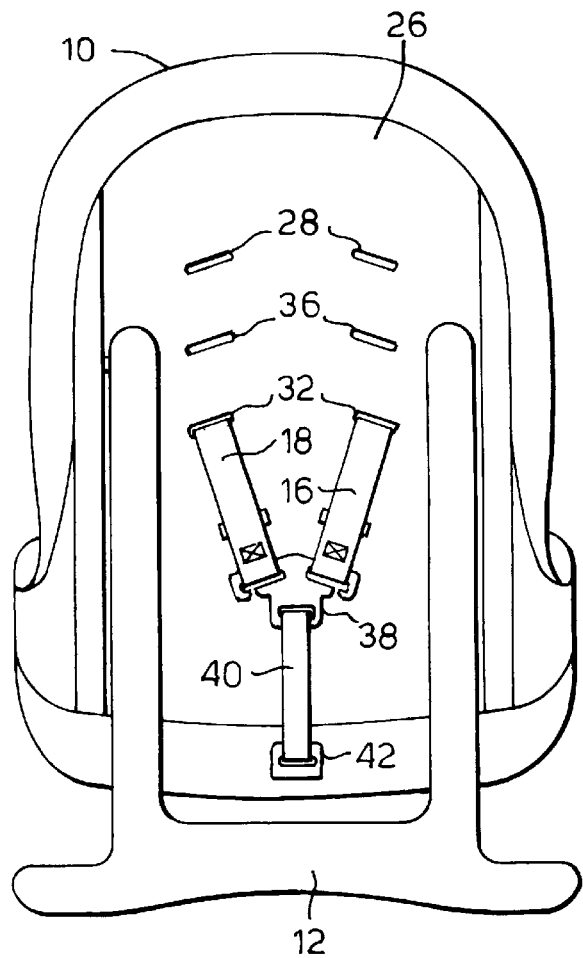
FIG. 3 is a rear view of the seat shown in FIG. 2.

As can best be seen in FIG. 3, the seat body 10 has a seat back 26 containing three pairs of slots for the shoulder straps 16 and 18. The upper slots 28 are used by a relatively large child 30A, as shown in FIG. 1. The lowest slots 32 are used by a relatively small child 34, as shown in FIG. 2, while the intermediate slots 36 are used by a child (not shown) between these two extremes. Behind the seat back 26, the shoulder straps 16 and 18 are connected by a yoke 38 to an adjuster strap 40 which projects through a locking adjuster 42 mounted on the bottom front edge of the seat body 10. The length of the shoulder straps between the buckle 24 and the appropriate slots 28, 32, 36 in the seat back 26 can be shortened by pulling on the end of the adjuster strap 40 where it protrudes at the front of the seat and can be lengthened by releasing the locking adjuster 42 and pulling outwardly on the shoulder straps 16 and 18 in the front of the seat body 10. This type of harness is in common use.

Figure 4:
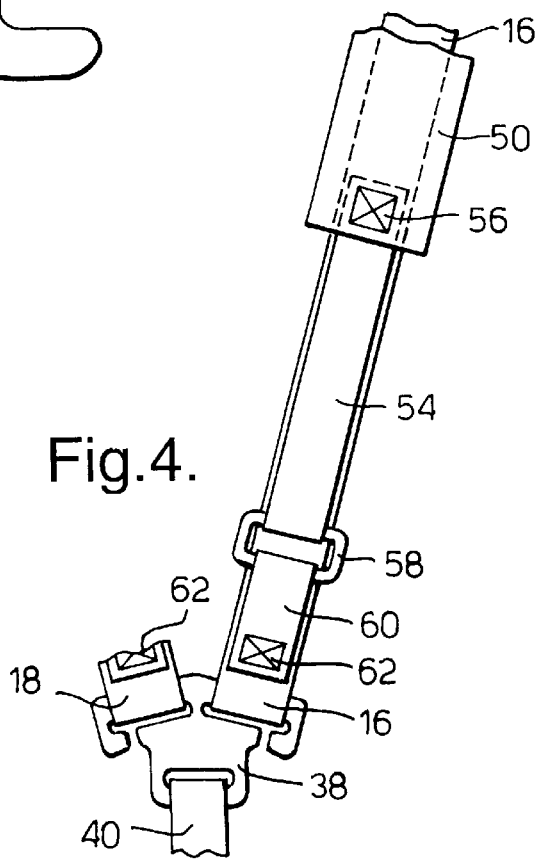
FIG. 4 is a plan view of part of one of the shoulder straps and associated parts of the harness removed from the child seat body.

As shown in FIGS. 4, 5 and 6, a chest pad 50 comprising a fabric sleeve is slidably mounted on the shoulder strap 16. A layer of material having a high coefficient of friction is secured to the side 52 of the pad 50 which abuts against the body of the child 30A or 30B.

A tether strap 54 has one end sewn to the side 52 of the chest pad 50 so as to lie between the shoulder strap 16 and the shoulder of the child 30 or 34. The other end of the tether strap 54 extends through the same slot 28, 32 as the shoulder strap 16 to behind the seat back 26, where it is attached to one bar of a two-bar link 58. The tether strap 54 is attached to the chest pad 50 by stitching 56. The other bar of two bar-link 58 is attached to one end of an elastic strap 60, the other end of which is attached by stitching 62 to the shoulder strap 16 in close proximity to the yoke 38. The width of the two bar-link 58 is such that it cannot pass through the slots 28, 32 or 36 when in the orientation shown in FIG. 4.

Referring to FIG. 5, the length of the tether strap 54 is such that the chest pad 50 is correctly positioned to engage with the chest of the older child 30A when harness is adjusted so that the two bar link 58 abuts against the seat back 26 adjacent to the lower edge of the slot 28. The chest pad 50 is thus held at a fixed distance along the shoulder strap 16 from the seat back 26. The friction between the surface 52 and the clothing of the child 30A resists slippage over the child's body and therefore reduces the extent to which the inertia of the child's body can cause stretching of the shoulder strap 16 during the period of highest deceleration of the child's body during an accident. The elastic strap 60 has no effect on the performance of the harness under these conditions.

Referring to FIG. 6, when the seat 10 is occupied by a smaller child 34 and the shoulder strap 16 extends through one of the lowest slots 32, the yoke 38 is further down the seat back 26 so that the elastic strap 60 and the tether strap 54 pull the upper end of the chest pad 50 into abutment with the part of the seat back 26 surrounding the slot 32. As can be seen from FIG. 6, most of the high friction surface 52 is out of contact with the body of the child and the zone of contact is limited to an area in the vicinity of the child's collar bone. Consequently, the chest pad 50 does not cause excessive loading on the chest of such a small child. The elastic strap 60 allows the shoulder strap 16 to be tightened even after the chest pad 50 has come into abutment with the seat back 26.

An identical chest pad 50, tether strap 54, two-bar link 58 and elastic strap 60 are provided on the other shoulder strap 18.

When it is desired to change the slots 28, 32, 36 through which the shoulder straps 16 and 18 are threaded, the ends of these shoulder straps are unhooked from the yoke 38. The two-bar links 58 can be threaded through the respective slots by twisting the adjacent straps so as to pass them through the slots endways on.

Figure 7:
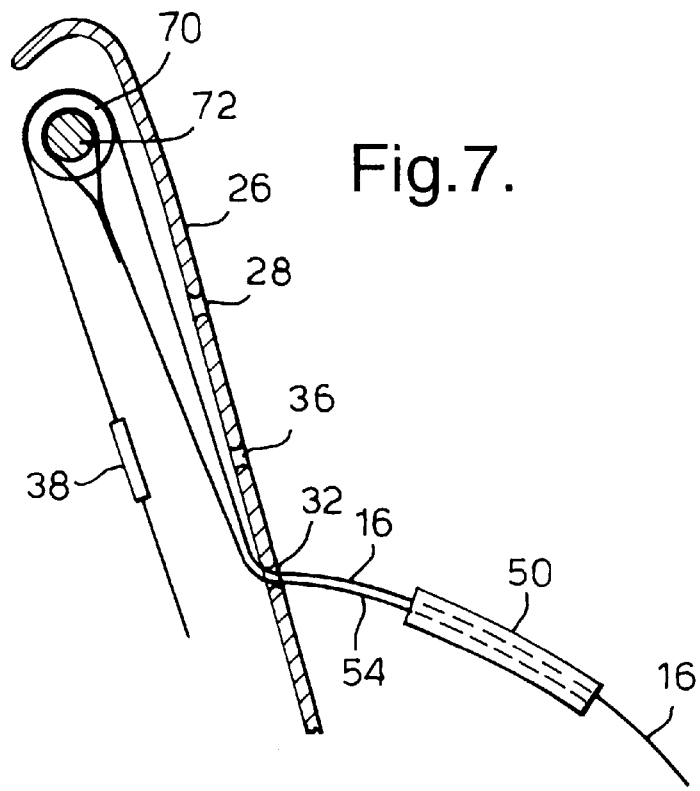
FIG. 7 is a fragmentary side view of a second embodiment of the invention.

FIG. 7 shows an alternative seat in which, after projecting through seat back 26, the shoulder straps 16 and 18 are lead round a roller 70 which is jornalled on a pivot bar 72 mounted on the seat body 10 near the top of the seat back 26. The tether straps 54 are attached to the bar 72. In FIG. 7, the shoulder straps 16 and 18 are shown as projecting through the lowest slots 32. The shoulder pads 50 can move further down the shoulder straps 16 and 18 when they project through the middle slots 36, and yet further if they are lead through the highest slots 28.

Figure 8:
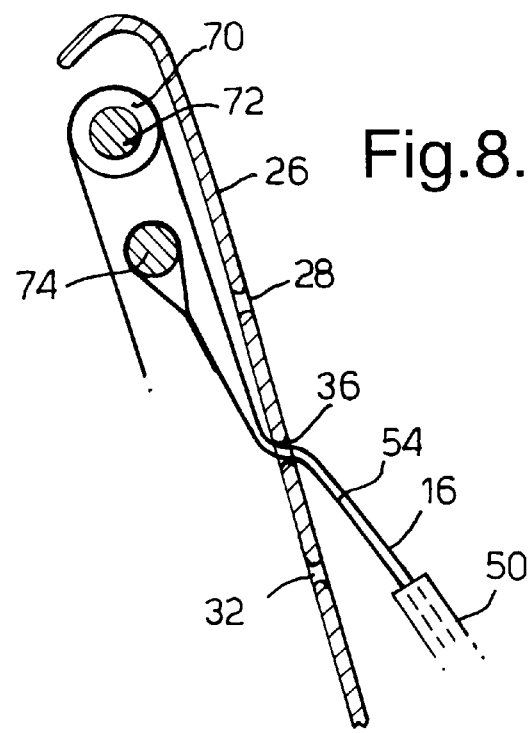
FIG. 8 is a fragmentary side view of a third embodiment of the invention.

The embodiment shown in FIG. 8 differs from that shown in FIG. 7 in that the tether straps 54 are attached to a separate bar 74 instead of to the pivot bar 72 for the roller 70.

In the embodiment shown in FIGS. 9 to 11, the free end of each tether strap is attached to a respective split three-bar link 76 (see FIG. 10) which can be threaded end-ways through the slots 28, 32 and 36. As shown in FIG. 9, when the shoulder straps 16 and 18 project through the lowest slots 32, the tether straps 54 are threaded back through the highest slot 28 so that a length of tether strap equal to the spacing between the highest and lowest slots 28 and 32 is retained behind the seat back 26.

When the tether straps 54 are threaded back through the highest slot 28 as shown in FIG. 11, the three-bar links 76 are located behind the highest slot 28 so that none of the tether straps 54 is retained behind the seat back 26. When the shoulder straps 16 and 18 project through the lowest slots 32, the tether straps 54 are threaded back through either the highest slots 28 or the lowest slots 32 so that a length of tether strap equal to the spacing between adjacent slots is retained behind the seat back 26.

In an alternative embodiment (not shown), the tether straps are connected to separate strap adjusters behind the seat back so that the length of each tether strap in front of the seat back can be adjusted manually.

In each embodiment, the individual pairs of slots 28, 32 and 36 may be replaced by a height adjustment system of the type described in EP-A-0287259.

What is claimed is:

1. A child safety seat for use in a vehicle comprising:
   a seat body having a seat back with slots therein,
   a harness for a child occupant of the seat, secured to the seat body and including a pair of shoulder straps extending through said slots in the seat back
   a mechanism for adjusting a length of the shoulder straps projecting through said slots, and
   means for varying a height at which the shoulder straps project from the seat back, and
   a pair of pads each slidably mounted on a respective shoulder strap and having a cover formed of high friction material on the side thereof facing the child occupant's body,
   a pair of tether straps each operative to limit movement of a corresponding one of the pair of pads along the shoulder strap to a predetermined limit distance away from the seat back; each strap having a first end connected to the corresponding pad and having a second end projecting through the same slot in the seat back as the corresponding shoulder strap; and
   wherein said second end is attached to an adjustment means operative to increase said predetermined limit distance as the height at which the corresponding shoulder strap projects from the seat back is increased.

2. The child safety seat according to claim 1, wherein the means for varying the height at which the shoulder straps project from the seat back comprises a plurality of slots for each shoulder strap each of said slots being located at a different height.

3. A child safety seat according to claim 2, wherein each tether strap is attached to a respective blocker dimensioned to abut against the seat back surrounding the slots so as to restrict the length of tether strap which can be protracted through a slot in the seat back while allowing continued protraction of the shoulder strap.

4. The child safety seat according to claim 3, wherein each blocker is connected to the corresponding shoulder strap by an elastic link adapted to allow continued retraction of the shoulder strap when the corresponding pad has come into abutment with the seat back.

5. The child safety seat according to claim 3, wherein each tether strap is adjustably connected to the corresponding blocker so as to permit adjustment of the length of tether strap between the blocker and the shoulder pad.

6. The child safety seat according to claim 2, wherein each tether strap is connected to an anchorage fixed to the seat body at a location behind the seat back above the uppermost slot edge.

7. A child safety seat according to claim 1, wherein each tether strap is attached to a respective blocker dimensioned to abut against the seat back surrounding the slots so as to restrict the length of tether strap which can be protracted through a slot in the seat back while allowing continued protraction of the shoulder strap.

8. The child safety seat according to claim 7, wherein each blocker is connected to the corresponding shoulder strap by an elastic link adapted to allow continued retraction of the shoulder strap when the corresponding pad has come into abutment with the seat back.

9. The child safety seat according to claim 7, wherein each tether strap is adjustably connected to the corresponding blocker so as to permit adjustment of the length of tether strap between the blocker and the shoulder pad.

10. The child safety seat according to claim 1, wherein each tether strap is connected to an anchorage fixed to the seat body at a location behind the seat back above the uppermost slot edge.

11. A child safety seat for use in a vehicle comprising:
a seat body having a seat back with slots therein,
a harness for a child occupant of the seat, secured to the seat body and including a pair of shoulder straps extending through said slots in the seat back
a mechanism for adjusting the length of the shoulder straps projecting through said slots,
means for varying the height at which the shoulder straps project from the seat back,
a pair of pads each slidably mounted on a respective shoulder strap and having a cover formed of high friction material on the side thereof facing the child occupant's body,
a pair of tether straps each operative to limit movement of a corresponding one of the pair of pads along the shoulder strap to a predetermined limit distance away from the seat back; each strap having a first end connected to the corresponding pad and having a second end projecting through the same slot in the seat back as the corresponding shoulder strap, said second end being attached to a respective blocker dimensioned to abut against the seat back surrounding the slots so as to restrict the length of tether strap which can be protracted through the slot in the seat back while allowing continued protraction of the shoulder strap, each respective blocker being connected to the corresponding shoulder strap by an elastic link adapted to allow continued retraction of the shoulder strap when the corresponding pad has come into abutment with the seat back.

12. A child safety seat for use in a vehicle comprising:
a seat body having a seat back with two sets of slots therein, the slots of each set being vertically spaced from one another,
a harness for a child occupant of the seat, secured to the seat body and including a pair of shoulder straps, each shoulder strap extending through a first slot of a respective one of said sets of slots,
a mechanism for adjusting the length of the shoulder straps projecting through said slots,
means for varying the height at which the shoulder straps project from the seat back,
a pair of pads each slidably mounted on a respective shoulder strap and having a cover formed of high friction material on the side thereof facing the child occupant's body,
a pair of tether straps each operative to limit movement of a corresponding one of the pads along the shoulder strap to a predetermined limit distance away from the seat back; each strap having a first end connected to the corresponding pad and having a second end projecting through said first slot and then back through a second slot of the same set as the first slot, said second end being attached to a respective blocker dimensioned to abut against the seat back surrounding said second slot so as to restrict the length of tether strap which can be protracted through a slot in the seat back while allowing continued protraction of the shoulder strap.

13. A child safety seat for use in a vehicle comprising:
a seat body having a seat back with two sets of slots therein, the slots of each set being vertically spaced from one another,
a harness for a child occupant of the seat, secured to the seat body and including a pair of shoulder straps, each shoulder strap extending through a first slot of a respective one of said sets of slots,
a mechanism for adjusting the length of the shoulder straps projecting through said slots,
means for varying the height at which the shoulder straps project from the seat back,
a pair of pads each slidably mounted on a respective shoulder strap and having a cover formed of high friction material on the side thereof facing the child occupant's body,
a pair of tether straps each operative to limit movement of a corresponding one of the pads along the shoulder strap to a predetermined limit distance away from the seat back; each strap having a first end connected to the corresponding pad and having a second end projecting through said first slot, said second end being attached to an anchorage fixed to the seat body at a location behind the seat back and above the uppermost slot of said set of slots so as to restrict the length of tether strap which can be protracted through the slot in the seat back while allowing continued protraction of the shoulder strap.

* * * * *